Patented Aug. 23, 1932

1,873,410

UNITED STATES PATENT OFFICE

VÁCLAV HORÁK, OF PRAGUE, CZECHOSLOVAKIA

FILTER INSERTION

No Drawing. Application filed March 14, 1929, Serial No. 347,186, and in Czechoslovakia March 14, 1928.

In gas warfare various substances are used which, according to their physical properties, act either firstly in the gaseous, secondly in the liquid, or thirdly in the solid state.
Thus in the second case it is a question of the suspension of fine drops in the air, that is to say of a poisonous mist, in the third case it is a question of the suspension of solid particles, that is to say a poisonous smoke.
Protection against gases and vapours is relatively easy and in the case of chemically reactive substances a chemical charge is made use of and in the case of less re-active substances, absorption either by activated carbon or some other absorptive medium.

As the vapour or smoke particles show the so-called Brownian molecular movement, they easily penetrate the ordinary filters and attack the human organism.
These particles can be removed from the air either by electro-static deposition or by mechanical filtration. Any mechanical filtration is very difficult to carry out, as particles of a very small diameter have to be stopped by the filter, while on the other hand the filter must not offer any great resistance, as otherwise any violent movement in the mask would be impossible owing to lack of air. In order to reduce the resistance large filters must be used, so that the filter insertions against mist or smoke as used at the present time occupy more than half the available space in the whole filter.

This disadvantage of the mechanical filters is overcome by the present invention by combining the physico-chemical filter with the mechanical filter in such a manner that the mechanical filter consisting of fibres is carbonized and activated.
Example of one method of production:

The vegetable fibres are cut into short pieces and with the addition of a binding medium are compressed into a compact mass which is thereupon carbonized in a known manner by being dried.

Vegetable fibres, e. g. hemp, jute, flax and so forth, are cut up into short pieces (from 3 to 5 cm. long) and, after addition of suitable binding media, e. g. argillaceous earth, infusorial earth, glue, etc., are compressed together into a shaped compact mass under a pressure of, for example, 1000 kg./cm$^2$. The moulded body so prepared is dried at about 35° C., and thereupon carbonized at about 300° C. The filter insertion is then subjected to activation. The activation consists in first impregnating the filter insertion with an activating substance, e. g. zinc chloride, steam, an acid of phosphorous, etc., and then heating to about 800° C. Only certain fibres with definite capillaries and of definite thickness are suitable for making filter insertions (e. g. flax 12–30$\mu$; hemp, 16–40$\mu$; jute 1723$\mu$).

By this means a filter insertion is obtained which in contradistinction to the filter insertions used hitherto (consisting of felt, cellulose or the like) consists entirely or substantially of porous activated carbon and therefore offers protection both against poisonous gases and also against mist and smoke.

This filter has the advantage that, while being more efficient, it enables the filter dimensions to be reduced by half or, with the same dimensions, the efficiency of the filter action to be increased by more than 100%. It should be noted that the filter insertions are prepared directly by this process.

What I claim is:

Process for producing filter insertions of small dimensions for gas masks to be used in the resultant molded cake-form without comminution, said insertions offering simultaneous protection against poisonous gases, smoke and mist, said process consisting in cutting vegetable fibres into short pieces, impregnating the fibres with a binder, compressing the mass into a compact form and thereupon carbonizing and activating the mass.

In testimony whereof I have signed my name to this specification.

VÁCLAV HORÁK.